United States Patent [19]
Buckley

[11] Patent Number: 4,786,138
[45] Date of Patent: Nov. 22, 1988

[54] OPTICAL-FIBER CABLE CONSTRUCTION

[75] Inventor: David L. Buckley, Monrovia, Calif.

[73] Assignee: Sea-Log Corporation, Pasadena, Calif.

[21] Appl. No.: 829,801

[22] Filed: Feb. 14, 1986

Related U.S. Application Data

[63] Continuation-in-part of Ser. No. 702,801, Feb. 19, 1985, abandoned.

[51] Int. Cl.$^4$ ............................................... G02B 6/44
[52] U.S. Cl. .................................................. 350/96.23
[58] Field of Search ...................................... 350/96.23

[56] References Cited

U.S. PATENT DOCUMENTS 4,370,023 1/1983 Lange et al. ..................... 350/96.23
4,422,718 12/1983 Nakagome et al. .............. 350/96.23

Primary Examiner—William L. Sikes
Assistant Examiner—Frank González
Attorney, Agent, or Firm—Christie, Parker & Hale

[57] ABSTRACT

There is provided an optical-fiber cable construction comprising a ruggedizing core providing at least one channel which contains at least one optical fiber surrounded by a gel. The gel is preferably thixotropic. The channel preferably extends from within the core to the external surface of the core, and the gel is partially contained in the core by means of a skin extending the width of the channel or by an axially oriented plug. The plug may be bonded to the walls of the channel or wedged in the channel.

14 Claims, 1 Drawing Sheet

OPTICAL-FIBER CABLE CONSTRUCTION

CROSS REFERENCE TO RELATED APPLICATIONS

This is a continuation-in-part of application Ser. No. 702,801 (now abandoned) filed Feb. 19, 1985.

BACKGROUND OF THE INVENTION

The use of light sent through optical fibers for the transmission of information is now in general acceptance as being technically feasible, reliable, and economical. Diversity of application and ever-lengthening time of in-service experience have defined various deficiencies to date in manufacture and place of service of cables. Other deficiencies relate to various degrees of cable production, insulation, and usage.

A major factor in overcoming cable deficiencies and maintaining cable integrity during production, packaging, installation, and operational service, is ruggedization. "Ruggedization" refers to strengthening and protecting of the optical fiber to increase resistance to wear, stress, and general abuse inherent in field-handling and usage. If optical fibers are not suitably ruggedized, they are fragile and susceptible to major increases in signal attenuation, as well as breakage. In addition, cables of conventional design have presented problems in coiling, particularly for high-density packaging. Proper ruggedization is therefore important to any cable design. There is also increasing recognition of the merits of using a cable made of dielectrics as compared to metals.

The present invention is therefore directed to the development of ruggedized optical fibers of substantially dielectric construction, which fibers enjoy the benefits of immunity from increased signal error due to stresses caused by ambient electric fields, and even burn-out from lightning and electromagnetic impulses. In addition, the optical-fiber cables of the instant invention are metal-free and most difficult to detect.

SUMMARY OF THE INVENTION

There is provided in accordance with the instant invention an optical-fiber-cable construction comprising a ruggedizing core providing at least one channel which contains at least one optical fiber surrounded by a gel. The gel is preferably a thixotropic material, more preferably a polytetrafluoroethylene compound.

The channel preferably extends from within the core to the external surface of the core. The gel is partially contained in the core by means of a skin extending the width of the channel or by an axially oriented plug, preferably a monofilament plug of a circular configuration. The plug may be bonded to the walls of the channel or wedged in the channel. The extension of the plug into the channel is preferably limited by a change in the width of the channel.

The core is preferably constructed of a fiber-reinforced resin, preferably a glass fiber-reinforced epoxy resin.

DETAILED DESCRIPTION

According to the present invention there is provided a novel optical-fiber cable which is metal-free and ruggedized so as to be able to withstand the rigors of installation and environmental use whether underground, undersea, or exposed to atmospheric conditions. While ruggedized, the cables of the instant invention are of relatively small diameter, enabling deployment by aircraft. This is of particular benefit to military and security operations, as the cables can be deployed from point to point, for instance, by draping the cables over trees. Because of their small size, and when provided with a matte or a mottled finish, the cables can be rendered virtually impossible to detect.

Another application of the ruggedized optical-fiber cable of the instant invention is the guidance of torpedoes launched by submarines, surface vehicles or aircraft, as well as missiles, such as air-to-surface and surface-to-air types.

A particular feature of the present invention is the suspension of optical fibers in a gel which uniformly distributes any pressures applied to the cable assembly about the fiber-optic. In consequence, microbends, which normally increase light attenuation, do not result.

More generally, the ruggedized optical fiber cable of this invention comprises a central, ruggedized element providing at least one channel to contain one or more optical fibers. The ruggedized element is preferably made of high-tensilestrength materials such as glass or aramid fibers, e.g., Kevlar and the like, bound by a thermoplastic or thermoset resin, with thermoset epoxy resin being particularly preferred. Examples of thermosetting resins include, among others, epoxy resins such as epoxidized cyclopentadiene, polyesters, phenolformaldehyde and ureaformaldehyde resins, dialkylphthalate resins, urethane resins, polyimides and the like. Examples of thermoplastic resins include polyesters, polyamides, acrylonitrilebutadiene-styrene, synthetic rubbers, and the like. The channel runs axially and includes at least one optical fiber contained in a surrounding gel. Any number of channels may be provided within a single ruggedized element for fiber-optic protection. The ruggedizing element may have any overall cross-sectional configuration and, as illustrated herein, may be of circular, rectangular, or other configuration, as dictated by the manufacturer or by packaging or service requirements. The presently preferred construction is generally circular, providing a "U" channel, as is illustrated in the attached drawings. This general ruggedizing structure makes the cable easy to coil.

Figure 1:
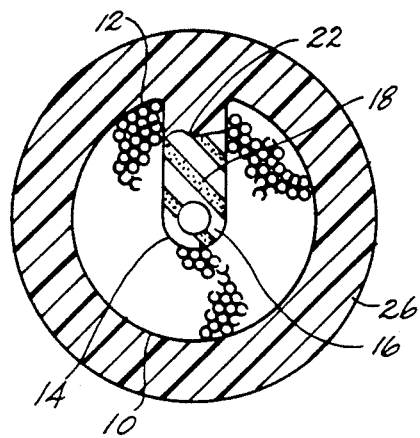
FIG. 1 illustrates one construction for the ruggedized optical-fiber cable of the instant invention.
Figure 2:
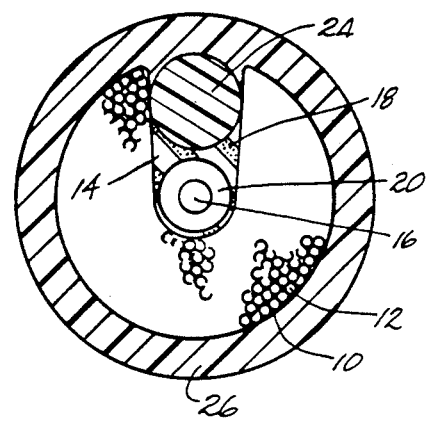
FIG. 2 illustrates an alternate construction of the ruggedized optical-fiber cable of the instant invention.
Figure 3:
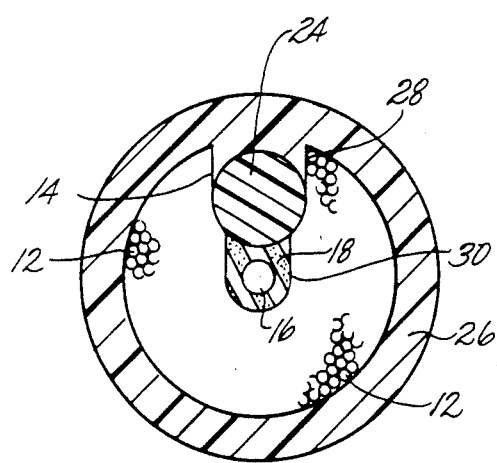
FIG. 3 illustrates yet another alternate construction of the ruggedized optical-fiber cable of the instant invention.
Figure 4:
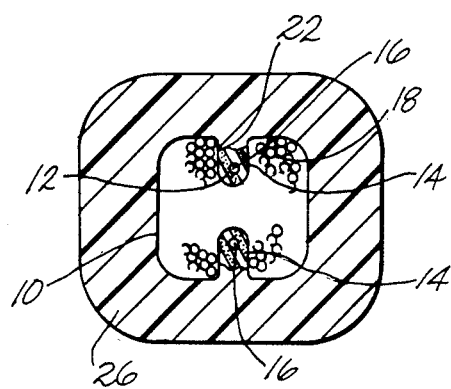
FIG. 4 illustrates an alternate to FIG. 1 showing a core containing more than one channel within the ambit of the instant invention.

With reference now to FIGS. 1, 2, 3 and 4, the ruggedized fiber-optic cable construction of the instant invention comprises a ruggedizing element or core 10, which may be formed of any flexible material, e.g., an extruded plastic such as ABS or the like, and is preferably composed of a single element, a single channel as shown in FIGS. 1, 2 and 3, or a single element in each of dual channels as shown in FIG. 4. In any event, each segment comprises a plurality of fibers 12 bound by a surrounding resin, which may be thermoset or thermoplastic in nature. Independent of the cross-sectional configuration of the core element 10, it is provided with at least one channel 14, which serves as a container for the optical fiber(s) 16 and surrounding gel 18. The optical fiber(s) 16 may be surrounded by a buffer 20, such as a room-temperature-vulcanized rubber and/or a kynar coating. Each channel 14 contains one or more optical fiber(s) 16 embraced by a gel 18, which surrounds and cushions the optical fiber(s) 16. Materials forming the gel include silicone compounds, fluorinated compounds, grease, liquid hydrocarbons, uncured epoxy resins, partially cured epoxy resins, and the like. The presently preferred gels are thixotropic, with a particularly preferred gel being a polytetrafluoroethylene compound known as Syncolt, manufactured and sold by Synco Chemical Corporation. Syncolt is of a smooth, buttery texture when used in a temperature range of from $-60°$ C. to $345°$ C. For the configuration shown in FIG. 1, a particularly preferred gel is one which is energy-curable, e.g., UV-curable, EB curable and the like. The surrounding gel 18 comprises a curable resin in gel form, and a photo initiator. By application of ultraviolet light, the upper surface 22 of the surrounding gel 18 is locally cured, i.e., cross-linked to a controlled depth. This creates a skin on the upper surface 22, which skin bonds to the walls of channel 14 to contain the gel within channel 14 in a fluid but gelled state, thereby enabling encasing of the cable in outer jacket 26.

The cross-sectional configuration may be of any desired shape such as circular as shown in FIGS. 1, 2 and 3, or generally rectangular as shown in FIG. 4, or the like.

As illustrated in FIG. 2, the surrounding gel 18 may be contained within its channel 14 by a plug 24, which may be an axially oriented plug, such as a monofilament plug, and which is contained by a close fit within channel 14. To control the limit of extension of plug 24 into channel 14, the walls of channel 14 may be tapered. An alternative, as shown in FIG. 3, is to change the width of channel 14 so that upper zone 28 receives plug 24, and lower zone 30 has a cross-sectional width less than the diameter of plug 24, to limit the penetration of plug 24 into channel 14. As desired, plug 24 can be bonded into position. This can be achieved by controlled curing of a portion of the gel, i.e., limiting cure to the surface of the gel in the vicinity of the plug to bond the latter to the walls of the channel. Again, energy-cures such as ultraviolet light, electron-beam cure and the like, may be used.

Outer jacket 26 may be of any suitable material, preferably a thermoplastic material which may be extruded about the ruggedized cable and the gel until all voids provided by the assembly are eliminated, and a smooth outer jacket is provided.

The cable construction is formed by fabrication of ruggedized core element 10, as a single unit. The gel is added, the optical fibers are then inserted in the gel, and any other filler material (to retain the gel) is added. This is followed by the application of the outer jacket 26. The optical fibers remain substantially at room temperature and are cushioned by the gel. This avoids thermal and other stresses which may otherwise arise during manufacture and/or end-use of the cable.

Instead of, or in addition to, employing extruded outer jacket 26, the assembly may be wrapped, following formation, with a thermoplastic wrapping, such as polyethylene, polypropylene and the like, to form a cable having a cushioned outer jacket 26, with gel-protected optical fibers being retained therein. The wrap may be molded together by use of ultrasonics or the like. In the manufacture of the assembly, there may be employed a non-adhering monofilament of a diameter greater than that of the optical fiber, which monofilament forms the channel during cure of the resin of the reinforcing fibers of the core, and is then stripped out. The gel may be introduced to the channel in a concentric mode by means of needle injection, along with or separate from the optical fiber. Care must be taken, however, to ensure that the gel completely encompasses the optical fibers contained within the gel. Adequate gel is introduced to fill the channel to a level so as to encompass all the optical fibers. A die may be employed to remove any excess gel above the desired level, and cure is utilized with or without addition of plug 24.

Several advantages are provided by the optical-fiber cable construction of the instant invention. Because the optical fiber itself is not subjected to a thermal cycle during construction of the cable, there is greater freedom in selection of the optical fibers and buffering employed. This wider choice can provide improved service characteristics for particular applications, and can reduce costs by a factor as great as three. Additionally, silicon is widely used in fiber-optic cable manufacture, but there is increasing evidence that long-term use of a silicon buffer leads to increased signal attenuation in optical fibers. Silicons currently used in optical-fiber manufacture have a high coefficient of thermal expansion, which advantageously counters stress that would otherwise be placed on the optical fiber during manufacture by current methods, thereby reducing high signal attenuation. By use of the cable construction of the instant invention, the gel surrounding the optical fibers eliminates the need for silicon or other material with high coefficient of thermal expansion.

Because of the containment of the optical fiber in the surrounding gel, the construction is essentially pressure-independent as regards light attenuation in the fiber optic. Accordingly, increased light attenuation will not result when the optical fibers are installed under the water or beneath the surface of the ground composite cable. This is not true of other cable constructions, even if they are ruggedized. The reason is because the optical fibers of the instant invention float in and are cushioned by the gel, which uniformly distributes pressures about the optical fibers and avoids non-uniform compressive loads. Accordingly, increased light attenuation will not result.

The nominal dimension for the width of ruggedized core element 10 is from 0.01 to 0.15 inch, and is from 0.005 to about 0.05 inch for channel 14, depending on the number of fibers to be retained, adjustment being necessary for a monofilament axial plug if one is used.

What is claimed is:

1. An optical-fiber cable construction having a central axis comprising a ruggedizing core providing a wall surface and at least one channel of a predetermined width, extending from within the core to the external surface of the core, said channel containing at least one optical fiber suspended in a surrounding gel which at least is partially contained in the channel by means of a cured skin extending the width of the channel.

2. An optical-fiber cable construction as claimed in claim 1 in which the gel is thixotropic.

3. An optical-fiber cable construction as claimed in claim 2 in which the thixotropic gel is a polytetrafluoroethylene compound.

4. An optical-fiber cable construction as claimed in claim 1 in which the gel is contained in the channel by means of an axially oriented plug.

5. An optical-fiber cable construction as claimed in claim 4 in which the axially oriented plug is of a circular cross-section.

6. An optical-fiber cable construction as claimed in claim 4 in which the axially oriented plug is bonded to the walls of the channel.

7. An optical-fiber cable construction as claimed in claim 4 in which the extension of the axially oriented plug into the channel is limited by a change in the width of the channel.

8. An optical-fiber cable construction as claimed in claim 1 in which the core is formed of a fiber-reinforced resin.

9. An optical-fiber cable construction as claimed in claim 8 in which the fiber is glass and the resin is a cured thermosettable epoxy resin.

10. An optical-fiber cable construction as claimed in claim 1 in which the core is surrounded by an outer coating.

11. An optical-fiber cable construction comprising a core having an axis formed of a fiber-reinforced resin and providing at least one channel having opposed interior walls of a predetermined width extending from within the core of the exterior surface of the core and containing at least one optical fiber surrounded by a thixotropic gel which fills a portion of the channel and is contained in the channel by means of a cured skin extending the width of the channel.

12. An optical-fiber cable construction as claimed in claim 11 in which the thixotropic gel is a polytetrafluoroethylene compound.

13. An optical-fiber cable construction as claimed in claim 11 in which the fiber is glass and the resin is a cured thermosettable epoxy resin.

14. An optical-fiber cable construction as claimed in claim 11 in which the core is surrounded by an outer coating.

* * * * *